United States Patent Office 2,945,837
Patented July 19, 1960

2,945,837

STABILIZED POLYMETHACROLEIN COMPOSITIONS WITH PHENOLS OR MERCAPTOBENZIMIDAZOLES

Robert Lee Eifert and Barnard Mitchel Marks, Wilmington, Del., assignors to E. I. du Pont de Nemours and Company, Wilmington, Del., a corporation of Delaware No Drawing. Filed Jan. 2, 1958, Ser. No. 706,589

15 Claims. (Cl. 260—45.8)

The process of the present invention relates to high molecular weight polymethacrolein and more particularly to the stabilization of polymethacrolein and copolymers thereof against thermal and oxidative degradation.

Methacrolein and other 2-substituted acroleins possess an inherent tendency to undergo autopolymerization to form infusible, insoluble resins which are of little or no value as a plastic material. Recently, however, methods have been discovered by which it is possible to polymerize methacrolein to high molecular weight polymers, which can be melt-fabricated into solid shapes of good mechanical properties and can be dissolved in organic solvents and cast into transparent rigid films and sheets. The polymethacroleins so prepared have inherent viscosities substantially above 0.3, softening points at about 240° C., and are essentially linear addition polymers of methacrolein containing pendent methyl groups and pendent aldehyde groups. The pendent aldehyde groups in the polymer impart chemical reactivity to the polymer which, although desirable for many purposes, reduces the stability of the unfabricated polymer and also reduces the stability of the polymer at fabrication temperatures. The stability of the polymethacrolein may be improved by the presence of metal oxides in the polymer; the metal oxides, however, are not completely satisfactory as stabilizers under extreme temperature conditions since they tend to discolor the clear, transparent resins.

It is an object of the present invention to prepare polymethacrolein and copolymers of methacrolein with vinyl monomers which have outstanding stability prior to fabrication and at fabrication temperatures.

It has been discovered in accordance with the present invention that polymethacrolein and copolymers of methacrolein with vinyl monomers copolymerizable therewith containing at least 75 weight percent of methacrolein can be stabilized against degradation by including from 0.01% to 5.0% by weight of the resin of a compound of the class consisting of phenolic compounds and aromatic sulfur compounds.

The phenolic compounds employed in the present invention are organic compounds which contain an aromatic radical and at least one hydroxy group linked to a carbon atom embraced in the nucleus of the aromatic radical. The phenolic compound may be monohydric or polyhydric and one or more hydrogen atoms of the aromatic nucleus may be substituted by organic radicals. Representative phenolic stabilizers suitable for the stabilization of polymethacrolein and copolymers of methacrolein are phenol, cresols, zylenols, naphthols, cumenols, carvacrol, thymol, eugenol, catechol, resorcinol, pyrogallol, hydroquinone, guaiacol, pyrocatechol, 2,4-dimethyl-6-octylphenol, 2,6-di-tert.-butyl - 4 - methylphenol, 2,6-bis(2'-hydroxy - 3' - tert.-butyl - 5' - methylphenyl)-4-methyl-phenol, 2,6 - bis(2'-hydroxy-3'-tert.-butyl-5'-ethylbenzyl)-4-methylphenol, 4 -tert. - butyl catechol, 2,5 - di-tert.-butyl-p-cresol, N-lauroyl-p-aminophenol, phenyl salicylate, 5-acenaphthenol, 2-tert.-butyl - 4 - methoxyphenol, α-conidendrin, β-conidendrin, α-conidendrol, β-coniden-drol, etc. 2,6-di-tert.-butyl-4-methylphenol is especially useful because of its excellent thermal color stability. Other preferred stabilizers for polymethacrolein are compounds having a substituted bis-phenol structure such as alkylene-bis(dialkyl phenols) of which representative examples are 2,2'-methylene bis(4-ethyl-6-tert.-butylphenol), 4,4' - butylidene - bis(2 - tert. - butyl - 5 - methylphenol), α,β-bis(2-hydroxy-5-methylphenyl) ethane, 2,2'-methylene bis(4 - methyl - 6 - tert. - butylphenol), 2,2'-dihydroxy-3-tert.-butyl-1-isobornyl - 5,5'-dimethyl-diphenyl-methane, 2,2'-methylene bis(tert.-butyl-hydroquinone) or 4,4'-methylene bis(2,6-di-tert.-butylphenol), etc., or such phenols as 4,4'-thio bis(6-tert.-butyl-m-cresol).

The sulfur stabilizers of the present invention are compounds containing the structure R—C—S—R' where R is an organic group containing an aromatic radical and R' is one of the class consisting of hydrogen and hydrocarbon radicals, such as methyl, ethyl, phenyl, tolyl, etc. The sulfur stabilizers of the present invention include thiocarbazides, mercaptobenzothiazoles, mercaptobenzoxazoles. A particularly preferred class of these sulfur stabilizers are 2-mercaptobenzimidazoles and substituted 2-mercaptobenzimidazoles such as 5-methyl-2-mercaptobenzimidazole, 1-phenyl-2-mercaptobenzimidazole, etc.

The homopolymers of methacrolein and copolymers of methacrolein with vinyl monomers are prepared by polymerization in aqueous media in which the monomer is soluble but the polymer is not soluble, and from which the polymer precipitates out in the form of a dispersion. The formation of a polymer solution or a coagulated polymer is to be avoided since in either case the resulting polymer is cross-linked and intractible and thus not suitable for fabrication into useful articles and shapes. The catalyst employed for the addition polymerization of methacrolein is a catalyst which is soluble in the reaction medium. Although a large variety of free radical catalysts may be employed, such as peroxides for example, it is in general preferred to employ redox catalysts since they are soluble in aqueous media and less dependent on temperature with respect to the rate of free radical formation. Redox catalysts which are suitable for the polymerization may be formed by the reaction of soluble multivalent metal salts in their higher valence states or any other soluble oxidizing agent such as inorganic peroxides with alkali metal or ammonium salts of inorganic reducing anions such as the hypophosphite, thiosulfate, sulfite, bisulfite or hyposulfite ion. It was found in the polymerization of methacrolein that the addition of an oxidizing agent was not essential and that methacrolein could be polymerized with just the reducing agent, e.g. sodium bisulfite. The quantity of the reducing agent employed is critical and should not exceed 0.005 mol percent of the monomer in order to obtain high molecular weight soluble polymer. Higher concentrations lead to the formation of lower molecular weight polymers.

The polymerization is preferably carried out in the presence of a finely divided inert adsorbtive solid such as coloidal silica, commercially available as "Ludox" or hydrolized tetra-ethyl-ortho silica. Polymerizations carried out in the presence of silica result in increased conversion to soluble high molecular weight polymer for reasons presently not clearly understood.

Since the solubility of the methacrolein in water is limited and more concentrated solutions of methacrolein are desirable for the preparation of soluble polymethacroleins with high molecular weight at efficient polymerization rates, preferred reaction media comprise water miscible mixtures of organic solvents and particularly mixtures of alcohols and water which impart sufficiently increased monomer solubility. Alcohols suitable for such purposes are methanol, ethanol, isopropanol, butanol, etc. The monomer concentration in the reaction medium is maintained in a range of 7 to 45% by weight of the medium, and preferably in a range of 20 to 45%. The polymerization is carried out at temperatures below 50° C. and preferably at temperatures of 20° to 35° C. in the substantial absence of oxygen. The monomer employed should be extremely pure to obtain reproducible polymerizations of methacrolein to high molecular weight. Commercially available monomer is therefore preferably purified by distillation or other means prior to being employed in the polymerization. The polymerization is preferably carried out in a slightly acidic medium.

Copolymers of methacrolein are prepared by polymerizing a mixture of the monomers under the same conditions employed for polymerizing methacrolein. The preferred vinyl monomers are those which are soluble in the reaction medium, and comprise principally acrylonitrile, acrylates, methacrylates, fumarates and other ethylenically unsaturated esters. The stabilizers of the present invention which have been found to improve the physical properties of the homopolymer were also found to improve the properties of copolymers which contained more than 50 mol percent of methacrolein in the polymer.

A representative method of the polymerization or copolymerization of methacrolein, described in greater detail, is as follows:

Into a 500 ml. reaction flask equipped with gas inlet and outlet, thermometer and stirrer is charged under nitrogen, 90 ml. of distilled deoxygenated water, 0.4 ml. of "Ludox," a commercially available 30% aqueous dispersion of colloidal silica, 100 ml. of methanol, 100 ml. of methacrolein, 3.6 ml. of a 1% aqueous sodium bisulfite solution and 4 drops of acetic acid bringing the pH of the reaction mixture to 4.4. The reagents are admixed with agitation in the order indicated. After addition of all of the ingredients, the reaction mixture is allowed to stand at room temperature without agitation for a period of 20 hours. On standing for approximately 30 minutes the clear reaction mixture clouds up as the polymer dispersion begins to form. After 20 hours, 10 to 50 ml. of a 2% methanol solution of stabilizer is added to the dispersion which is then coagulated by agitation or addition of electrolytes and the polymer is filtered, washed, preferably treated with additional amount of stabilizer solution and dried. The molecular weight of polymethacrolein obtained by this polymerization technique, as measured by inherent viscosity of a 0.5% solution in pyridine at 35° C. varies from about 1.2 to 1.5. With variation in the ingredient quantities employed polymethacroleins having inherent viscosities from 0.3 to 3.0 are obtained.

The addition of the stabilizers to the polymethacrolein may be carried out by various methods. Thus the stabilizer may be mixed into the polymer powder as it is obtained after coagulation. A preferred method of introducing the stabilizer comprises adding a solution or dispersion of the stabilizer in an aqueous, alcoholic or organic solvent medium, compatible with the polymerization medium, to the polymer dispersion prior to coagulation and thereafter coagulating the polymethacrolein from the polymerization medium. Other methods for incorporating the stabilizer include washing or digesting the polymer with a solution of the stabilizer.

In testing the compositions of the present invention, many methods may be employed in measuring the improved results obtained. Particularly suitable tests are shelf life tests in which the change in molecular weight as indicated by change in inherent viscosity of a polymer sample, in finely divided powder form, in contact with air is measured at various time intervals, and melt stability tests in which the change of melt flow at elevated temperatures over a period of time is measured.

The melt flow of a polymer is readily determined by extruding the polymer at a temperature above its melting point through a narrow orifice and measuring the amount of polymer that is extruded in a specific period of time. The melt flow test employed in the testing of the compositions of the present invention is essentially the melt index test described in ASTM-D-1238-52-T except that the orifice of the melt indexer is 0.0823", the weight of the piston forcing the polymer through the orifice is 3800 g. and the temperature of the melt indexer is maintained at 275° C. The flow number of the polymer is that weight of polymer in grams which is extruded in 10 minutes. The smaller the change in flow number with increasing exposure, the better is the stability of the polymer.

The change of molecular weight in the shelf life test is obtained from changes in inherent viscosity over a period of time. Inherent viscosity measurements are made employing 0.5% solutions of the polymer in pyridine at 35° C. The inherent viscosity is calculated from the following equation:

$$\zeta_{inh} = \ln\left[\frac{t}{t_0}\right] \times \frac{1}{C}$$

where $t$ is the viscosity of the solution, $t_0$ the viscosity of the solvent, and $c$ the concentration of the polymer in g. per 100 cc. of solvent. The smaller the change in inherent viscosity with increasing exposure the better is the stability of the polymer.

The tables below illustrate the improved shelf life stability and melt stability of the compositions of the present invention. The stabilizers listed in the table were incorporated by adding a 2% solution of the stabilizer in methanol to the polymer dispersion, precipitating the polymer and washing the polymer with a 2% solution of the stabilizer.

Table A below demonstrates the shelf life stability of the compositions of the present invention. The polymer employed, the stabilizer added, the quantity of stabilizer added and the inherent viscosity measurements after 0, 10, 20, 40 and 70 days of exposure are shown.

TABLE A

| Polymer | Stabilizer | Percent Stabilizer | Shelf Life Stability on Room Temperature Air Exposure as Measured by Inherent Viscosity | | | | |
|---|---|---|---|---|---|---|---|
| | | | 0 days | 10 days | 20 days | 40 days | 70 days |
| Copolymer of methacrolein with 3% ethyl acrylate. | None | 0 | .63 | 0.04 | | | |
| | 4,4'-butylidene-bis(2-tert.-butyl-5 methylphenol). | 1 | .97 | .94 | .83 | .75 | .63 |
| | 4,4'-thio-bis(2-tert.-butyl-5-methyl-phenol). | 1 | 1.13 | 1.13 | 1.14 | 1.12 | 1.09 |
| | N-lauroyl-p-aminophenol | 1 | 1.07 | 1.01 | .92 | .80 | .60 |
| | α-conidendrin | 1 | .85 | .84 | .67 | | .27 |
| | 2-Mercaptobenzimidazole | 1 | .94 | .90 | .85 | .82 | .77 |
| | Phenyl salicylate | 1 | .35 | .13 | .08 | | 0.08 |
| | 2,6-di-tert.-butyl-4-methylphenol | 1 | 1.46 | 1.46 | 1.46 | 1.47 | 1.48 |
| | 2,2'-methylene-bis(4-methyl-6-tert.-butylphenol). | 1 | 1.17 | 1.16 | 1.15 | 1.07 | |
| Homopolymer of methacrolein | None | 0 | 0.87 | 0.17 | | | |
| | 2,6-di-tert.-butyl-4-methylphenol | 1 | 1.14 | 1.16 | 1.10 | 1.08 | 1.06 |

Table B below demonstrates the improvement in melt stability obtained by the measurement of flow numbers as described hereinabove. The polymer employed the stabilizer added, the quantity of stabilizer employed, and the flow numbers obtained after stated intervals of exposure are shown.

TABLE B

| Polymer | Stabilizer | Percent Stabilizer | Flow Numbers at 275° C. After— | | | | |
|---|---|---|---|---|---|---|---|
| | | | 7 min. | 10 min. | 15 min. | 20 min. | 25 min. |
| Copolymer of methacrolein with 3% ethylacrylate. | None | 0 | (2 g. charge passes through in less than 10 seconds) | | | | |
| | 4,4'-butylidene-bis(2-tert.-butyl-5-methylphenol). | 1 | 3.3 | 5.3 | 7.8 | 10.8 | |
| | 4,4'-thio-bis(2-tert.-butyl-5-methylphenol). | 1 | 12 | 22 | 48 | | |
| | N-lauroyl-p-aminophenol | 1 | 2.5 | 3.4 | 4.6 | 6.8 | 9.6 |
| | 2-Mercaptobenzimidazole | 1 | 1.1 | 1.5 | 2.8 | 4.8 | 8.6 |
| | 2,6-di-tert.-butyl-4-methylphenol | 1 | .46 | .57 | .80 | 1.2 | 1.6 |
| Polymethacrolein | 2,6-di-tert.-butyl-4-methylphenol | 1.5 | 1.1 | 1.6 | 2.0 | 2.7 | |
| | 2,6-di-tert.-butyl-4-methylphenol | 1 | 0.2 | 0.27 | 0.49 | 0.78 | 1.2 |
| | 2,6-di-tert.-butyl-4-methylphenol Propyl gallate | 1.0 0.5 | 3.7 | 4.8 | 6.9 | 9.0 | |
| Copolymers of methacrolein with 3% ethylacrylate. | 2,6-di-tert.-butyl-4-methylphenol Dixylenol butane | 1.0 0.5 | 1.8 | 2.6 | 4.1 | 5.9 | |
| | 2,6-di-tert.-butyl-4-methylphenol 2-Mercaptobenzimidazole | 1.0 0.1 | .88 | 1.1 | 1.46 | 2.0 | |

The stabilized polymethacroleins of the present invention are particularly useful in the fabrication of melt extruded and molded articles. Thus fibers and films may be prepared by solution spinning and solution casting or by melt extrusion. The polymers are also suitable for injection molding of solid shapes. Polymethacrolein in fused form has a high degree of rigidity, transparency and weatherability and thus is exceedingly useful in a host of industrial and consumer applications.

We claim:

1. A resinous composition having increased thermal and oxidative stability comprising an additional polymer of methacrolein selected from the class consisting of homopolymers of methacrolein and copolymers of methacrolein with vinyl ester comonomers containing at least 75% by weight of methacrolein, having therein dispersed from 0.01 to 5 weight percent of a stabilizer selected from the class consisting of phenolic compounds and mercaptobenzimidazoles of the class consisting of unsubstituted, methyl-substituted and phenyl-substituted mercaptobenzimidazole.

2. A resinous composition of increased thermal and oxidative stability comprising an addition polymer of methacrolein selected from the class consisting of homopolymers of methacrolein and copolymers of methacrolein with vinyl ester comonomers containing at least 75% by weight of methacrolein having therein dispersed from 0.01 to 5 weight percent of polyalkyl phenol.

3. A resinous composition of increased thermal and oxidative stability comprising an addition polymer of methacrolein selected from the class consisting of homopolymers of methacrolein and copolymers of methacrolein with vinyl ester comonomers containing at least 75% by weight of methacrolein having therein dispersed from 0.01 to 5 weight percent of an alkylene bisphenol.

4. A resinous composition of increased thermal and oxidative stability comprising an addition polymer of methacrolein selected from the class consisting of homopolymers of methacrolein and copolymers of methacrolein with vinyl ester comonomers containing at least 75% by weight of methacrolein having therein dispersed from 0.01 to 5 weight percent of a dihydroxydiphenyl sulfide.

5. A resinous composition of increased thermal and oxidative stability comprising an addition polymer of methacrolein selected from the class consisting of homopolymers of methacrolein and copolymers of methacrolein with vinyl ester comonomers containing at least 75% by weight of methacrolein having therein dispersed from 0.01 to 5 weight percent of unsubstituted mercaptobenzimidazole.

6. A resinous composition of increased thermal and oxidative stability comprising an addition polymer of methacrolein selected from the class consisting of homopolymers of methacrolein and copolymers of methacrolein with vinyl ester comonomers containing at least 75% by weight of methacrolein having therein dispersed from 0.01 to 5 weight percent of a 2,2'-methylene-bis(dialkylphenol).

7. The resinous composition set forth in claim 2 wherein the polyalkyl phenol is 2,6-di-tert-butyl-4-methylphenol.

8. The resinous composition set forth in claim 3 wherein the alkylene bisphenol is 4,4'-butylidene-bis(2-tert-butyl-5-methylphenol).

9. The resinous composition set forth in claim 4 wherein the dihydroxy-diphenyl sulfide is 4,4'-thio bis(2-tert-butyl-5-methylphenol).

10. The resinous composition set forth in claim 2 wherein the addition polymer of methacrolein is a homopolymer of methacrolein.

11. The resinous composition set forth in claim 2 wherein the addition polymer of methacrolein is a copolymer of methacrolein and an alkyl acrylate.

12. The resinous composition set forth in claim 3 wherein the addition polymer of methacrolein is a homopolymer of methacrolein.

13. The resinous composition set forth in claim 3 wherein the addition polymer of methacrolein is a copolymer of methacrolein and an alkyl acrylate.

14. The resinous composition set forth in claim 6 wherein the addition polymer of methacrolein is a homopolymer of methacrolein.

15. The resinous composition of claim 6 wherein the addition polymer of methacrolein is a copolymer of methacrolein and an alkyl acrylate.

References Cited in the file of this patent
UNITED STATES PATENTS

| 2,212,894 | Allen | Aug. 27, 1940 |
| 2,264,034 | Allen | Nov. 25, 1941 |
| 2,554,973 | Ballard et al. | May 29, 1951 |

UNITED STATES PATENT OFFICE
CERTIFICATE OF CORRECTION

Patent No. 2,945,837                           July 19, 1960

Robert Lee Eifert et al.

It is hereby certified that error appears in the printed specification of the above numbered patent requiring correction and that the said Letters Patent should read as corrected below.

Column 2, line 61, for "silica" read -- silicate --; column 5, line 3, after "employed" insert a comma; line 39, for "additional" read -- addition --.

Signed and sealed this 20th day of December 1960.

(SEAL)
Attest:

KARL H. AXLINE                                        ROBERT C. WATSON
Attesting Officer                                    Commissioner of Patents